United States Patent Office 2,844,008
Patented July 22, 1958

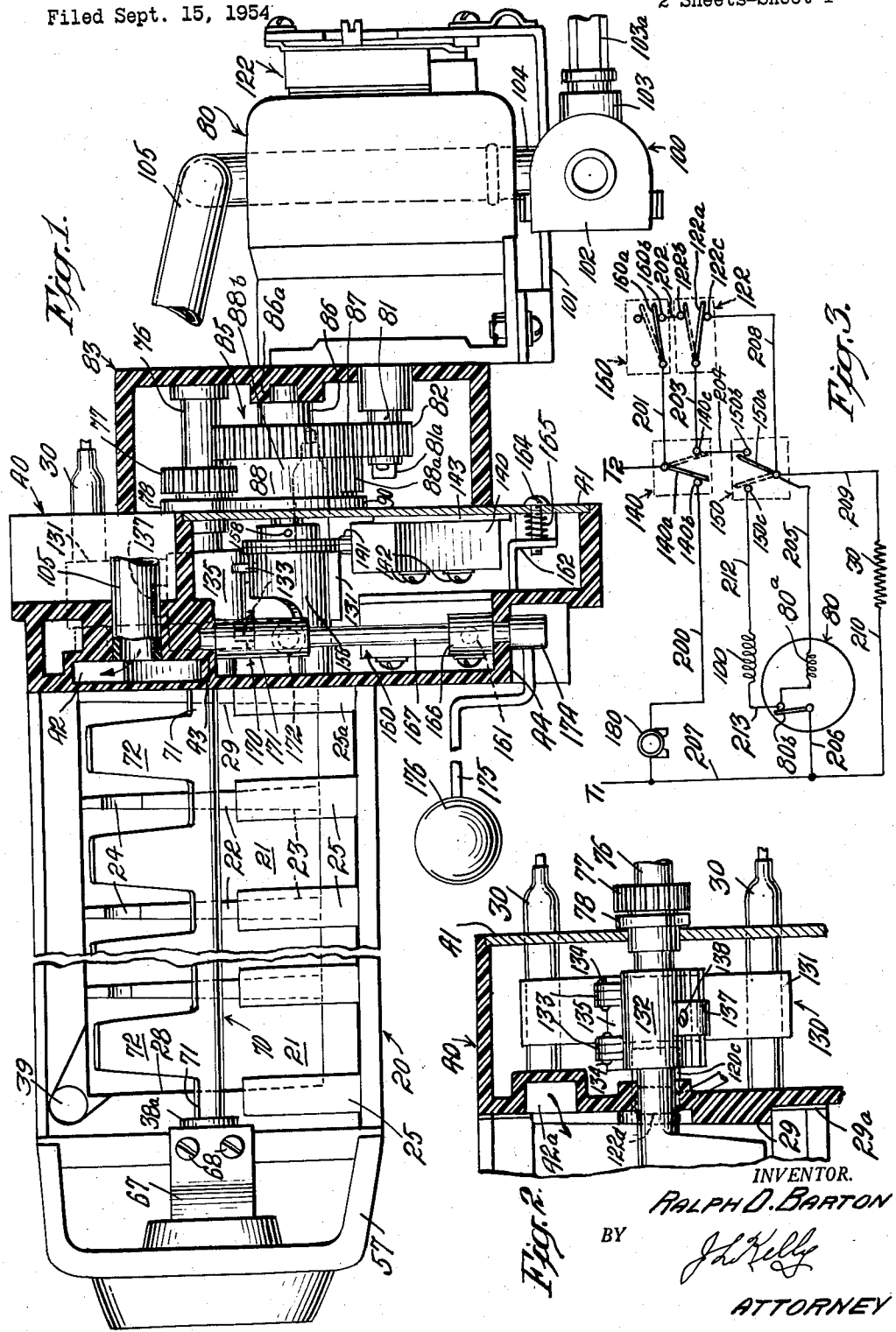
July 22, 1958     R. D. BARTON     2,844,008
ICE MAKING APPARATUS
Filed Sept. 15, 1954     2 Sheets-Sheet 1
INVENTOR.
RALPH D. BARTON
BY
J. L. Kelly
ATTORNEY

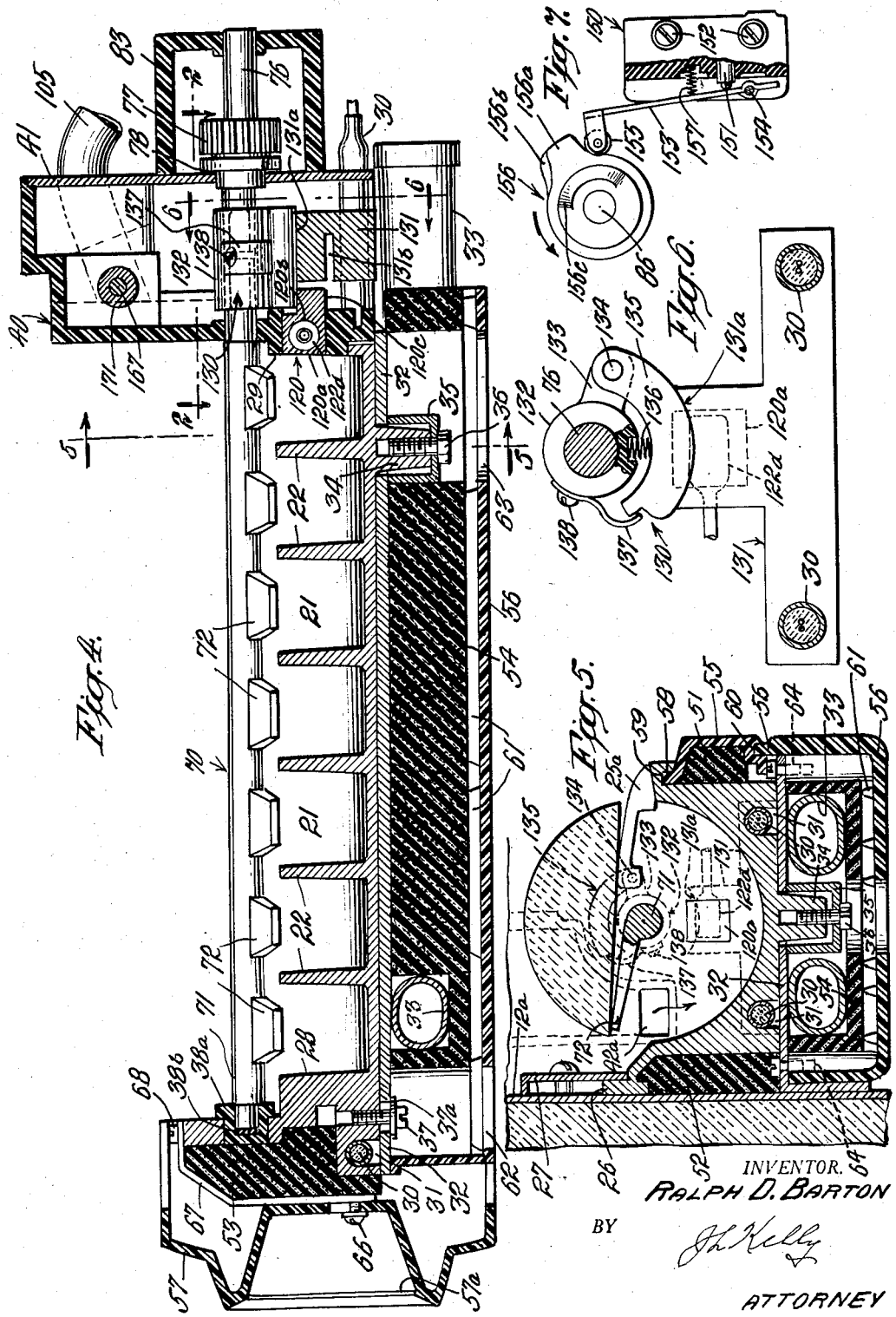

2,844,008
ICE MAKING APPARATUS

Ralph D. Barton, Evansville, Ind., assignor, by mesne assignments, to Whirlpool Corporation, a corporation of Delaware Application September 15, 1954, Serial No. 456,109

8 Claims. (Cl. 62—135)

This invention relates to automatic making, harvesting, drying, and storing of ice pieces, generally called ice cubes.

This invention relates particularly to ice makers like that disclosed and claimed in the copending patent application of Harry C. Shagaloff, Serial No. 329,097, filed December 10, 1952.

The above copending Shagaloff application discloses an automatic ice maker wherein an ice mold and an ejector mechanism are located within the low temperature or freezing compartment of a household refrigerator. The ice mold is placed in thermal contact with a freezing shelf to which is attached a freezing coil, and the interior of the mold is divided into a plurality of ice forming compartments, each having a generally arcuate contour so that the ejector mechanism, which is mounted above the mold, may rotate through the ice forming compartments of the mold and sweep the ice pieces therefrom. The end wall of the rear ice-forming compartment of the mold is formed of thermal insulating material into which is embedded a metal insert having a front surface thereof in contact with water in the rear ice-forming compartment of the mold, an intermediate portion in thermal contact with the temperature sensing bulb of a thermostat and with the rear surface thereof in thermal contact with a reset heater. The arrangement is such that the water in the rear compartment of the mold is last to freeze and the complete freezing of this water is used to operate the thermostat, which in turn energizes the ejector mechanism. The ice removing action is automatic, as is the filling of the mold, freezing, and loosening of the ice pieces. The ice pieces are detained on the ejector mechanism for thorough drying before discharged to storage. The automatic operation is stopped short of discharge of ice to storage and remains suspended during the time that a desired quantity of ice is held in storage. Power for operating the ejector mechanism and the control mechanism therefor is provided by a geared electric motor. This motor is of the type that will stall while energized when the ejector mechanism contacts the ice frozen solidly in the mold without burning out or otherwise harming the motor. The disclosure of the above copending patent application of Harry C. Shagaloff may be considered a part of this instant application and reference thereto may be made for a detailed description of parts in common with the instant application.

Briefly, in accordance with the instant invention, there is provided a multi-compartment ice mold having the rear wall of the rear ice-forming compartment thereof formed of a plastic or other thermal insulating material, whereby the water in the rear compartment is last to freeze. In order to sense the temperature of the last water to freeze, a water contact insert is located in the plastic rear wall and the sensing bulb of a mold thermostat is placed in thermal contact with the insert. A mold heater is placed in thermal contact with the mold for thawing the ice free thereof, and a stationary heat conductor is placed in thermal contact with the mold heater and thermally spaced from the water contact insert. During an ice release cycle, when the mold heater is energized, a movable heat conductor, mounted on the ejector shaft but thermally insulated therefrom, is rotated into contact with the mold insert and with the stationary heat conductor and remains in this position while the ejector is stalled against the ice frozen in the mold. During this time, while the mold heater is energized, a heat path is closed between the mold heater and the sensing bulb of the mold thermostat, thus supplying the necessary heat for resetting the mold thermostat switch. After the ice batch is melted free of the mold, the ejector shaft continues to rotate to complete the ice removal operation. The movable heat conductor carried by the ejector shaft is therefore rotated away from the stationary heat conductor and from the mold insert, thus interrupting the heat path from the mold heater to the thermostat sensing bulb during the freezing cycle. In this manner the sensing bulb is influenced only by the temperature of the last water to freeze, and during freezing cycles there is substantially no heat removed from the water contact insert and thermostat sensing element through the heat conductors to the mold heater, which mold heater stands at a relatively low temperature during freezing cycles.

It is a general object of this invention to provide an improved control for automatic ice makers.

More specific objects of this invention are:

To provide an improved means for sensing the temperature of water being frozen;

To provide an improved means for heating the temperature sensing element of an ice maker thermostat; and To provide means for shielding a temperature sensing element from undesired temperature influences.

The invention, together with the above and other objects and advantages, is set forth in more technical detail in the following description and accompanying drawings, wherein:

Fig. 1 is a top plan of an automatic ice maker incorporating this invention, with parts in section and other parts broken away;

Fig. 2 is a detail top plan and horizontal section taken on line 2—2 of Fig. 4;

Fig. 3 is a schematic wiring diagram of the controls for the ice maker;

Fig. 4 is a longitudinal vertical section through the ice maker;

Fig. 5 is a transverse vertical section taken on line 5—5 of Fig. 4;

Fig. 6 is an enlarged transverse vertical section taken substantially on line 6—6 of Fig. 4; and Fig. 7 is a detail showing of a micro switch and cam operating mechanism therefor.

For purposes of illustration, this invention is incorporated in an automatic ice maker like that disclosed in the companion patent application of Carl J. Knerr, Serial No. 456,106 now Patent 2,717,497, filed concurrently herewith, in which application the ice maker is located within the freezing compartment of a household refrigerator and wherein there is provided a storage receptacle below the ice maker to receive ice therefrom. For a detailed description of the location of the ice maker and parts thereof in common with the instant invention, reference may be had to said Knerr application.

GENERAL DESCRIPTION

Referring now to Figs. 1, 4 and 5, the ice maker includes, generally, an ice mold 20, a mold heating element 30, a freezer shelf 32 upon which the mold is supported and which is cooled by a refrigerating coil 33, which coil is attached to the refrigerating system, not shown. The ice mold is surrounded at the sides, front and bottom by thermal insulation and the insulation is encased in an insulation housing, to be referred to in detail hereinafter. The rear ice-forming compartment of the ice mold is closed by a combined closure member and support 40, which member is formed of plastic, such as phenol formaldehyde, or other suitable thermal and electrical insulating material. An ejector mechanism 70 is mounted above the ice mold for rotary movement therethrough for sweeping the ice pieces therefrom, and is journaled at its front end in a bearing at the upper front end of the mold and at its rear is the rear closure member 40.

The rear closure member 40 is generally in the shape of a box, open at the rear and closed by a metal closure plate 41. The closure plate 41 supports three micro switches 140, 150 and 160, and provides bearing surfaces for a rear ejector shaft 76 and a timing gear shaft 86, to be referred to in detail hereinafter. Of the three micro switches: the micro switch 140 is operated by a cam 156 on the timing gear shaft and deenergizes and reenergizes a compressor motor 180 (see wiring diagram, Fig. 3) of the refrigerator system at the beginning and end, respectively, of an ice release cycle; the micro switch 150 is operated by the same cam 156 and this micro switch energizes a solenoid-operated water valve 100 (Fig. 1) for a precise number of seconds near the end of the ice release cycle; and the micro switch 160 is operated by a cam surface 156c on the front of cam 156 and acts as a cutoff to automatically deenergize the ice maker when the ice receptacle is filled with a given amount of ice pieces. The micro switch 160 is adapted for manual operation, as pointed out hereinafter.

Mounted on the rear of the metal closure plate 41 is a gear housing 83 which contains and journals an ejector gear 77, a timing gear assembly 85 and a motor gear 82. The timing gear assembly is a form of Geneva movement, to be referred to in detail thereafter. An electric motor 80 for driving the ejector mechanism and the controls therefor is mounted on the rear of the gear housing 83. This electric motor is geared down from 3400 R. P. M. to approximately 2.5 R. P. M. at its output shaft, and is of a type that stalls while energized when the ejector blades initially contact the ice frozen solidly in the mold without burning out or otherwise harming the motor. A motor of this type is disclosed and claimed in a copending patent application of Sven W. E. Andersson, Serial No. 325,145, filed December 10, 1952, now Patent 2,717,541.

Mounted on the right side of the ejector motor 80, Fig. 1, is a precision solenoid-operated water valve 100. The inlet of valve 100 is connected to a suitable source of water under pressure, such as the house line, and the outlet is connected by a conduit 105 to the rear of a vertical passage 42 formed in the rear closure and support member 40, which passage discharges water through an outlet 42a (Fig. 5) into the rear ice-forming compartment of the mold. A mold thermostat 122 and a heat transfer mechanism 130 for transferring heat from the mold heater 30 to the sensing bulb 122a (Fig. 6) of the mold thermostat to reset such thermostat, each to be referred to in detail hereinafter, are mounted on the rear of the ice maker.

Ice mold

Referring now to Figs. 1, 4 and 5, the ice mold 20 comprises an aluminum die casting divided into a plurality of ice-forming compartments 21 by transverse partitions 22. The ice-forming compartments are generally semi-circular in transverse vertical section, and the partitions are tapered horizontally from the right to the left side thereof as viewed from the front in Fig. 1. The partitions have a slight taper in the vertical direction. The partitions are each provided with an upstanding projection 23 on the right side and with a weir or notch 24 in the left side thereof, as viewed in Fig. 1. A thermal insulator 25, made of nylon or the like, is fitted upon each of the upstanding projections 23 of the mold partitions. As shown in Fig. 5, and as pointed out hereinafter, the insulators 25 support one side of the ice pieces during the drying thereof and prevent the ice from sticking to the upstanding projections of the mold partitions. The outer surface of each of the weirs 24 is of the same general curvature as the inner surface of the ice mold compartments, and the inner surface of the weirs is substantially vertical. As viewed in Fig. 1, the weirs are progressively smaller from the rear to the front of the mold.

Referring to Fig. 5, the ice mold is provided with an upstanding and offset flange 26 along the left side thereof, which flange is clamped in heat exchange relation with the left side wall 12a of the freezing compartment of the refrigerator by a clamp 27. The front and rear walls 28 and 29, respectively, of the ice mold slant outward from right to left as viewed from the front in Fig. 1. The mold heater 30, in the form of a hairpin coil, is located in slots 31 (Figs. 4 and 5) in the bottom of the mold at each side and at the front end thereof. The mold rests on the freezer shelf 32 that is cooled by the refrigerating coil 33, which also is in the form of a hairpin. As shown in Fig. 5, the refrigerating coil is formed out of round for good thermal contact with the undersurface of the freezer shelf to which it is welded, or otherwise secured. The refrigerating coil 33 is connected to a suitable refrigerating machine, not shown.

As shown in Figs. 4 and 5, the mold is provided with a boss 34 projecting from the bottom rear thereof which passes through an opening in the freezer shelf, and which clamps the rear of the mold to the shelf by means of a thimble 35 held in place by a screw 36 threaded into the boss. The front of the mold is attached to the freezer shelf by a screw 37 threaded into the mold casting and provided with a washer 37a. The front of the mold is shaped as shown in Fig. 4, and is provided with an integral boss drilled to receive a bearing 38a made of nylon or other suitable thermal insulating material, and the bearing is provided with a filler 38b made of neoprene rubber, or like material. The bearing 38a receives and supports the front end of the ejector shaft 71, to be referred to hereinafter.

As shown in Fig. 1, the front ice-forming compartment of the mold is formed with an overflow duct 39 that insures against excess filling of the ice-forming compartments, as pointed out hereinafter. In case of overflow, the duct 39 discharges into the ice receptacle (not shown) located beneath and to the right of the mold.

Ice mold insulation

So as to confine the heat transferred to the refrigerating coil 33 to that extracted from the water in the ice mold compartments and transferred therefrom through the mold and the freezer plate 32 to the coil, and to add to the decorative appearance of the ice maker, the mold is provided with insulation and with decorative housing members at the sides, front and bottom thereof. The insulation members are made of unicellular sponge rubber that is impervious to moisture and, as shown in Figs. 4 and 5, include a right side member 51, a left side member 52, a front member 53 and a bottom member 54. The side and front insulation members are formed to fit the exterior contour of the ice mold, and the bottom insulation member is cut out to receive the refrigerating coil 33, the screws 36 and 37 for attaching the ice mold to the freezer shelf and a set of screws 64 for attaching this bottom insulation housing to the freezer shelf.

The insulation housing members, which are preferably made of a thermal insulating, moisture-proof and decorative material, such as white polystyrene, include a right side member 55, a bottom member 56 and a front member 57. The right side member (Fig. 5) is formed with an inwardly and upwardly projecting flange 58 adapted to fit within a groove 59 along the upper right side of the ice mold and with a lower inwardly extending flange provided with a groove 60 to receive the right upper edge of the bottom housing member 56. The bottom housing member 56 is dish-shaped, open at the back, and includes spacing ribs 61, which provide a space between this member and the bottom insulation member 54, and two openings 62 and 63 (Figs. 4 and 5), for access to the screws 36 and 37. This bottom housing member is attached to the freezer shelf by four screws 64, located at the front and back at each side thereof. Also, the bottom housing member 56 is provided with a channel (not shown) at the front left corner thereof (Fig. 1) to receive the lower end of the overflow duct 39 of the ice mold. The front insulation housing 57 is shaped as shown in Figs. 1 and 4 and is attached by a screw 66 to a bracket 67, which bracket is attached to the front upper portion of the ice mold by a pair of screws 68. The front closure member 57 is formed with access openings at the top and front thereof, and the front opening is closed by a decorative, spring-held disk 57a (Fig. 4). Any moisture that may migrate into the mold insulation during freezing periods is collected in the bottom housing member and drains therefrom through the openings 62 and 63 into the ice receptacle during the ice thawing periods, as pointed out hereinafter.

Ejector mechanism

As shown in Figs. 1, 4 and 5, the ejector mechanism 70 includes a front ejector shaft 71 mounted for clockwise rotation at its front end in the nylon bearing 38a at the front of the ice mold and at its rear end in a suitable bearing located in the rear closure member 40, which member, as pointed out heretofore, is made of thermal insulating material. Extending tangentially (Fig. 5) from one side of the front ejector shaft 71, and formed integral therewith, is a plurality of ejector blades 72; there being one such blade for each ice-forming compartment 21 of the ice mold 20. The ejector shaft 71 is mounted in the plane of the longitudinal axis of the ice mold, and is spaced from the upper edges of the mold partitions 22. At the rear, this ejector shaft is connected by a thermal insulating coupling 132 (Fig. 4) to a rear ejector shaft 76, which rear ejector shaft is connected to the electric motor 80 by a timing gear assembly 85, to be described in detail hereinafter. The nylon coupling 132 forms a part of the mechanism 130 for transferring heat from the mold heater 30 to the sensing element 122d of the mold thermostat 122, as described in detail hereinafter. As shown in Fig. 5, the outer upper edges of the ejector blades 72 cooperate with the insulators 25 in supporting the ice pieces above the ice mold for drying wetted surfaces thereof before discharge into the storage receptacle.

Power and timing mechanism

As pointed out heretofore, the electric motor 80 for driving the ejector mechanism 70 and the controls therefor is a stall motor equipped with internal gears (not shown) for reducing its speed from 3400 R. P. M. to approximately 2.5 R. P. M. at its output shaft 81. The motor field winding 80a and overload limit switch 80b are shown diagrammatically in Fig. 3. The motor output shaft 81 (Fig. 1) is formed with a square portion 81a upon which is keyed a gear 82. The motor gear 82 is meshed with a rear gear 87 of the timing gear assembly 85, which timing gear assembly is fixedly mounted on a shaft 86, journalled at its rear in a bearing 86a (Fig. 1) formed in the gear housing 83 and at its front in a bearing (not shown) formed in the metal closure plate 41. In front of the gear 87 (as viewed in Fig. 1) is a timing gear 88 having a toothed portion 88a and a blank portion 88b on the periphery thereof. In front of the timing gear 88 is a timing cam 90 having a high portion and a low portion (not shown) on the periphery thereof. The gears 87 and 88 and the cam 90 are held as an assembly by dowel pins. Fixedly mounted on the rear ejector shaft 76, and in mesh with the teeth of timing gear 88, is an ejector gear 77, and in front of the ejector gear (Figs. 1 and 4) and fixed to the rear ejector shaft 76 is an ejector cam 78 having a high portion and a low portion (not shown) on the periphery thereof.

The arrangement is such that upon rotation of the ejector motor 80, the motor gear 82 (Fig. 1) rotates the rear gear 87 of the timing gear assembly, which two gears have meshing teeth throughout the 360° of their periphery, and rotation of the gear 87 causes rotation of the timing gear 88 and of the timing cam 90. As the timing gear 88 is rotated, the toothed portion 88a thereof is brought into mesh with the teeth of the ejector gear 77, which latter gear is provided with teeth throughout the 360° of its periphery, whereupon the ejector gear 77, the rear ejector shaft 76, the ejector cam 78, the nylon coupling 132 and the front ejector shaft 71 are rotated in unison. Rotation of the ejector gear 77 continues (neglecting for the present the stalling of the ejector mechanism by contact of the ejector blades 72 with the ice frozen solidly in the mold compartments) until the blank portion 88b of the timing gear 88 is juxtaposed with the teeth of the ejector gear 77 at which time the high portion of the timing cam 90 is in mesh with the low portion of the ejector cam 78, whereupon the ejector gear 77, shaft 76, coupling 132 and shafe 71 are held stationary while the ejector motor 80, the motor gear 82, and the timing gear assembly 85 and cam 90 continue to rotate for a definite period before the motor is deenergized, as pointed out hereinafter. During a freezing cycle of operating, the timing gear 88 and the ejector gear 77 are substantially in the relative positions shown in Fig. 1 with the high portion of cam 90 in contact with the low portion of cam 78. Thus the ejector mechanism is locked in the position shown in Fig. 5 for drying the ice pieces resting thereon.

WATER METERING AND MOLD FILLING MECHANISM

Mounted on a bracket 101 on the side of the motor 80 is the solenoid-operated water valve 100 (Fig. 1). This valve is a precision mechanism in that it accurately meters a definite quantity of water therethrough when open; the opening and closing of which is accurately timed as pointed out hereinafter. This valve includes a body member 102 having an inlet connection 103 and an outlet connection 104. The inlet connection is provided with a nipple 103a that extends through the rear of the refrigerator (not shown) for connection to a suitable source of water under pressure, such as the house line. The outlet connection 104 is connected to the ice mold by a tube 105 that opens into the passage 42 formed in the rear closure member 40. For a detailed description of the solenoid-operated valve 100 reference may be had to the above copending patent application of Carl J. Knerr, Serial No. 456,106.

Controls

As disclosed in the above copending application of Carl J. Knerr, Serial No. 456,106, now Patent 2,717,497 and as shown in Figs. 1 and 4, the rear ice-forming compartment of the ice mold casting is open and is closed by the rear closure and support member 40, which member is formed of a plastic, such as phenol formaldehyde that is a good thermal and electrical insulation. Integrally formed on the front face of the closure member 40 is a raised portion that fits into the rear of the ice mold and forms the rear wall 29 of the rear ice-forming compartment. The rear wall 29 is provided with an insulator 25a, similar to the insulators 25 on the upper edges of the mold partitions 22. A gasket 29a seals the rear outer surface of the mold casting against the adjacent front surface of the closure member 40. The purpose of the insulating rear wall 29 of the ice mold is to make sure that the water in the rear ice-forming compartment is last to freeze, and complete freezing of the water in this rear compartment is utilized to energize the ice release mechanism, as disclosed and claimed in the above copending patent application of Harry C. Shagaloff, Serial No. 325,097, filed December 10, 1952, now Patent 2,717,541.

For this purpose, in accordance with the instant invention and as shown in Figs. 4, 5 and 6, a metal insert 120, preferably of aluminum, is embedded in the rear wall 29 of the ice mold, which wall is formed on the closure member 40. This insert includes a front portion 120a, that is flush with the rear wall 29 of the rear ice forming compartment and is in contact with water to be frozen in such compartment, a transverse bore 120b into which is fitted the sensing bulb 122d of the mold thermostat 122, and a rearwardly projecting portion 120c formed with an arcuate upper surface. Mounted on the otherwise exposed ends of the mold heater 30 and spaced from the rear of the metal insert 120 is a heat conductor 131 formed with an arcuate upper portion 131a and with a slot or air gap 131b. Mounted above and substantially concentric with the arcuate surfaces of the insert 120 and of the heat conductor is the nylon coupling 132 that joins the front and rear ejector shafts 71 and 76, respectively.

As shown particularly in Figs. 2 and 6, the nylon coupling 132 is formed with a pair of arms 133 to which is pivoted, as by pivot pins 134, an arcuate heat conductor 135. The outer arcuate surface of the heat conductor 135 is of the same curvature as that of the upper arcuate surface 131a of the heat conductor 131 and of the rear portion 120c of the metal insert 120. A compression spring 136 (Fig. 6) urges the heat conductor 135 into contact with the upper arcuate surfaces 120c of the insert 120 and 131a of the heat conductor 131, and a stop member 137, mounted on the nylon coupling 132 by a screw 138, limits outward movement of the conductor 135. So as to regulate the amount of heat transferred from the mold heater 30 to the thermostat sensing bulb 122d, the heat conductor 131 may be moved along the two prongs of the mold heater from the position shown in Fig. 4 to thereby contact more or less of the active heating surfaces of the mold heater. The heat conductor may be adjustably held on the two prongs of the mold heater 30 by a friction fit, or, if desired, by a suitable adjusting screw (not shown).

The arrangement is such that upon rotation of the ejector mechanism 70, as described hereinafter, at the beginning of an ice release cycle, the movable heat conductor 135 is rotated from the position shown in Fig. 5 into contact with both the stationary heat conductor 131 and the rear portion 120c of the metal insert, as shown in Figs. 4 and 6, and it remains in this latter position while the ejector mechanism is stalled against the ice. During this time while the mold heater 30 is energized, the heat path is closed between the mold heater 30 and the thermostat bulb 122d, through the stationary heat conductor 131, the rotary heat conductor 135 and the rear portion 120c of the metal insert, thus supplying the necessary heat to the thermostat sensing bulb 122d to reset the mold thermostat switch. After the ice pieces are thawed free of the mold compartments by the mold heater 30, the ejector mechanism resumes rotation to complete the ice removal operation. The movable conductor 135 carried by the ejector shafts 71 and 76 is therefore rotated away from the stationary heat conductor 131 and from the rear portion 120c of the metal insert 120, thus interrupting the heat path during the next freezing cycle, as shown in dotted lines in Fig. 5.

Referring now to Fig. 1, the micro switch 140 that deenergizes and reenergizes the compressor motor 180 (shown only in the wiring diagram in Fig. 3) at the beginning and end, respectively, of an ice release cycle, is mounted by a pair of screws 142 upon a bracket 143, which bracket in turn is welded or otherwise secured to the metal closure plate 41. This micro switch includes a spring-pressed plunger 141 that is urged into contact with a cam 156, to be described in detail hereinafter, and when in contact with the high portion of the cam, which is the stationary position of the cam during an ice freezing cycle, the switch is in the full line position shown in Fig. 3 and the compressor motor 180 is energized; whereas shortly after the beginning of an ice release cycle, the high portion of the cam 156 leaves the plunger 141, and the switch 140 is shifted to the broken line position (Fig. 3), whereupon the compressor motor is deenergized, and remains so until near the end of an ice ejecting cycle when the high portion of the cam 156 again contacts the switch plunger 141 and returns the switch 140 to the full line position.

The second micro switch 150 that energizes and deenergizes the solenoid valve 100, is also mounted on the closure plate 41 by a bracket and a pair of screws 152 (Fig. 7). This switch 150 includes a plunger 151 operated by a lever 153. The lever 153 is pivoted near its lower end on a post 154, and at its upper or free end is bifurcated to receive a roller 155. The roller rides upon the cam 156 and is urged into contact therewith by a compression spring 157. The cam 156 (as best shown in Figs. 1 and 7) comprises a front portion 156a fixedly mounted on the timing gear shaft 86 and a rear portion 156b adjustably mounted by a set screw 158 (Fig. 1) upon the shaft 86. The purpose of this adjustment is to vary the combined length of the high or camming surfaces of the front and rear portions of the cam; the combined length of which high portions of the cam determine the length of time that the solenoid valve 100 is energized and water flows therethrough to the ice mold. It is to be noted that the plungers 141 and 151 of micro switches 140 and 150, respectively, are operated by the same cam 156, and during an ice freezing cycle the switches 140 and 150 are in full line positions (Fig. 3) with the compressor energized and the solenoid valve deenergized.

The micro switch 160, that automatically deenergizes the ice maker when the ice receptacle (not shown) is filled with a given amount of ice pieces, is mounted on a bracket 162 (Fig. 1), the lower end of which is attached by a screw (not shown) to the metal closure plate 41, and the upper end of which is adjustably connected to the closure plate by a screw 164 having a compression spring 165 thereon. The micro switch 160 includes a spring-pressed plunger 161 operated by a cam 166 mounted on a shaft 167, which shaft is journalled at its ends in partition walls 43 and 44 of the rear closure member 40. The purpose of the adjusting screw 164 is to center the plunger 161 below the cam 166 (Fig. 1). A lift arm 170, including a sleeve 171 with a roller 172 attached thereto by a shoulder screw (not shown), is fixedly and adjustably mounted on the shaft 167, near the partition wall 43. A second sleeve 174 is attached to the opposite end of the shaft 167 and a stop-arm 175, made of stainless steel or other relatively rigid material, is attached at one end to sleeve 174. The stop-arm is formed with an offset near its attached end (as shown in Fig. 1) and is provided with a relatively heavy metal ball 176 on its free end. The lift arm 170 is raised by a cam member 156c (Fig. 7) formed on the front surface of the cam 156.

The arrangement is such that upon rotation of the timing gear assembly 85 the high portion of the cam 156c is brought into contact with the roller 172 (Fig. 1), whereupon the shaft 167 is rotated in a clockwise direction through a given arc. This clockwise rotation of the shaft 167 brings the high portion of cam 166 into contact with the switch plunger 161, which depresses the plunger and opens the switch 160 (Fig. 3), thereby opening a circuit to the ejector motor 80 in which this switch is contained. Clockwise rotation of the shaft 167 also lifts the stop-arm 175 and attached ball 176. Continued rotation of the timing gear assembly 85 (Fig. 1) causes the high portion of cam 156c to leave the roller 172 on the lift-arm 170, whereupon, assuming that the ice storage receptacle is not yet filled with ice pieces, the ball 176 falls by gravity and through the arm 175 rotates the shaft 167 counterclockwise to its normal position which removes the high portion of the cam 166 from the switch plunger 161, and this in turn causes the switch 160 to return to its closed position (Fig. 3). Should the ice receptacle be filled with the desired amount of ice pieces, gravity movement of the ball 176 and stop-arm 175 is blocked by the ice, causing the switch 160 to remain open after the high portion of cam 156c has left the lift-arm 170 and until some ice has been removed from the receptacle.

As in the companion application of Carl J. Knerr, referred to above, the ice maker may be shut down and caused to stand idle at will by manually lifting the ball 176 and stop-arm 175 to an uppermost position and engaging the arm in a spring clip (not shown) mounted on the ceiling of the freezing compartment directly above the stop arm 175. With the stop-arm 175 engaged in the spring clip, the ice maker will complete a freezing cycle, but, because the switch blade 160a of micro switch 160 is held in open position (Fig. 3) against a dead terminal 160c, a subsequent ice ejecting cycle cannot be initiated. Therefore, the ice maker stands idle with a batch of ice pieces frozen in the mold and a second batch of ice resting on the ejector mechanism above the mold (Fig. 5) ready to be discharged into the storage receptacle. Operation of the ice maker may be resumed by manually removing the stop-arm 175 from engagement with the spring clip.

WIRING DIAGRAM

Referring to Fig. 3, T1 and T2 are the two sides of a 115 volt A. C. supply circuit, between which are connected by several circuits, the compressor motor 180 for the refrigeration system, the micro switches 140, 150 and 160, the electric thermostat 122 for the ice mold, the ejector motor 80 with the motor field 80a and limit switch 80b, the mold heater 30, and the solenoid water valve 100. The full line position of the several switches in Fig. 3 is their normal position during an ice freezing cycle of the ice maker.

A first circuit (the only circuit for the compressor motor 180) includes the conductor T2, a movable switch blade 140a (in full line position) of micro switch 140, a stationary contact 140b, a conductor 200, the compressor motor 180, and T1. A conventional thermostat (not shown) for controlling the operation of the refrigerating system, responsive to the temperature of the refrigerator, may be included in the compressor motor circuit.

A second circuit (a first circuit for the ejector motor 80) includes the conductor T2, a conductor 201, movable switch blade 160a (in full line position) of micro switch 160, a stationary contact 160b, a conductor 202, a stationary contact 122b, a movable switch blade 122a (in broken line position) of the ice mold thermostat 122, a conductor 203, a stationary contact 140c, a conductor 204, a stationary contact 150b, a movable switch blade 150a (in full line position) of micro switch 150, a conductor 205, the motor field 80a, the motor limit switch 80b, a conductor 206, a conductor 207 and T1.

A third circuit (second circuit for the ejector motor 80) includes the conductor T2, movable switch blade 140a (in broken line position) of micro switch 140, the stationary contact 140c, conductor 204, stationary contact 150b, movable switch blade 150a (in full line position), conductor 205, motor field 80a, motor limit switch 80b, conductor 206, conductor 207 and T1.

A fourth circuit (third circuit for the ejector motor 80) includes the conductor T2, movable switch blade 140a (in broken line position), conductor 203, movable switch blade 122a (in full line position), a stationary contact 122c, a conductor 208, conductor 205, motor field 80a, motor limit switch 80b, conductor 206, conductor 207 and T1.

A fifth circuit (a circuit for the mold heater 30, is in parallel with that part of each of the above circuits for the ejector motor 80 between the micro switch 150 and T1) includes a conductor 209, the mold heater 30, a conductor 210, conductor 207 and T1. This circuit to the mold heater is energized when switch blade 160a is in full line position, switch blade 122a is in broken line position and switch blade 150a is in full line position, and when switch blade 140a is in broken line position and switch blade 150a is in full line position, and when switch blade 140a is in broken line position and switch blade 122a is in full line position. Thus, the mold heater 30 is energized at all times that the ejector motor 80 is energized.

A sixth circuit (the circuit for the solenoid water valve 100 is in parallel with that part of the circuits for the ejector motor 80 between the micro switch 150 and the motor limit switch 80b) includes the movable switch blade 150a (in broken line position), a stationary contact 150c, a conductor 212, the coil of the solenoid 100, a conductor 213, the limit switch 80b of the ejector motor 80, conductors 206, 207 and T1. This circuit for the solenoid water valve is energized only when the movable switch blade 140a is in broken line position, the movable switch blade 122a is in full line position, the movable switch blade 150a is in the broken line position and the motor limit switch 80b is closed. The movable switch blade 150a is in the broken line position only when the high portions of cams 156a and 156b are brought into contact with the roller 155 of micro switch 150.

*Operation*

In operation, assuming that the several switches are in the full line position shown in Fig. 3, that the ice receptacle (not shown) is not yet filled with the desired quantity of ice pieces and that the stop arm 175 is in its lowermost position; in other words, the ice maker is in operation. With the several switches in the full line position shown in Fig. 3, the compressor motor 180 is energized and water is being frozen in the several compartments of the ice mold. Due to the fact that the end wall 29 of the rear ice forming compartment of the mold is made of thermal insulating material, water in the rear ice forming compartment will be last to freeze, and when this water is completely frozen, the temperature (26–28° F.) on the surface 120a in contact with the water being frozen is reflected through the metal insert 120 (Fig. 5) to the sensing bulb 122d of the mold thermostat, whereupon the thermostat switch 122a is shifted from the full to the broken line position (Fig. 3). This shifting of the thermostat switch 122a establishes an initial circuit from T2 through conductor 201, stop arm switch 160a (in full line position), stationary terminal 160b, conductor 202, stationary terminal 122b, thermostatic switch blade 122a (in broken line position), conductor 203, stationary circuit 140c, conductor 204, stationary conductor 150b switch 150a (in full line position), conductor 205, motor field 80a, motor limit switch 80b, conductor 206, conductor 207 and T1, whereupon the ejector motor 80 is energized. The shifting of the thermostat switch 122a to the broken line position also establishes a parallel circuit through the conductor 209, the mold heater 30, conductor 210, conductor 207 and T1, whereupon the mold heater 30 is energized.

Energization of the ejector motor 80 causes rotation of the motor, motor gear 82, timing gear 87, gear shaft 86, timing gear 88, timing cam 90, and cam 156. The ejector motor 80 is otherwise unloaded during its initial rotation, and shortly after the cam 156 begins to rotate, the high portion of cams 156a and 156b leave plunger 141 of micro switch 140, whereupon the movable switch blade 140a is shifted from the full to the broken line position in Fig. 3. This shifting of the switch blade 140a deenergizes the compressor 180 of the refrigerating system and establishes a holding circuit for the ejector motor from T2 to T1 through the switch blade 140a (in broken line position), stationary contact 140c, conductor 204, stationary contact 150b, movable switch blade 150a (in full line position), conductor 205, ejector motor 80, and conductors 206 and 207. This shifting of the switch blade 140a also establishes a holding circuit through the mold heater 30. With continued rotation of the ejector motor and the timing gear assembly, the cam surface 156c on the front of cam 156 is brought in contact with the roller 172 (Fig. 1) of the stop arm assembly 170, whereupon the shaft 167 is rotated clockwise with the result that the plunger 161 of micro switch 160 is depressed and the switch blade 160a is shifted from the full to the broken line position (Fig. 3). Rotation of the shaft 167 also lifts stop arm 175 and attached ball 176 to an upper position.

At about this point in the rotation of the ejector motor and the timing gear assembly, the high portion of cam 90 will have been removed from the low portion of cam 78, and the toothed portion 88a of gear 88 will have meshed with the teeth of the ejector gear 77, whereupon the ejector gear 77, ejector shaft 76, ejector cam 78, coupling member 132 and the ejector shaft 71 with fingers 72 attached thereto are rotated in a clockwise direction (Fig. 5). This clockwise rotation of the ejector shaft 71 and attached fingers 72 causes the dried ice pieces that have been resting on the ejector fingers 72 and on the insulators 25 (Fig. 5) to be discharged over the side of the mold into the ice receptacle, not shown.

Shortly after the batch of ice pieces have been discharged over the side of the mold, the timing mechanism will have rotated to the point that the high portion of cam surface 156c will have passed the roller 172 on stop arm assembly 170, whereupon the weighted ball 176 on stop arm 175 will fall by gravity (assuming that the ice receptacle is not yet filled with ice pieces) and rotate the shaft 167 counterclockwise, thereby removing the high portion of cam 166 from the switch plunger 161 and returning switch blade 160a to the full line position (Fig. 3). Should the ice receptacle be filled with the desired quantity of ice pieces, at this point, the weighted ball 176 will be held up by the ice and the stop switch 160a will be held in the broken line or open position (Fig. 3). However, because of the holding circuit through the switch blade 140a (in broken line position) the ejecting cycle will continue to completion, but a new ejecting cycle cannot be initiated until some ice pieces are removed from the storage receptacle and the stop switch 160a closed.

The ejector motor continues to rotate until the ejector fingers 72 contact the ice frozen solidly in the several compartments of the mold, whereupon the ejector motor is stalled. However, the ejector motor 80 and the mold heater 30 remain energized, with the motor urging the ejector fingers against the ice so that the instant the ice is thawed free of the mold compartments, the motor 80 resumes its rotation. As the ejector shaft 71 and attached fingers 72 rotate from the position shown in Fig. 5, approximately 180°, to the position where the fingers 72 contact the ice and the motor stalls, the coupling 132 with the heat conductor 135 attached thereto will have rotated from the broken line position shown in Fig. 5 to the position shown in Figs. 2, 4 and 6, whereby the arcuate portion of the heat conductor 135 is brought into contact with the upper arcuate portion 131a of heat conductor 131 and with the upper arcuate portion 120c of the metal insert 120. With the heat conductors 135, 131 and 120 in the relative positions shown in Figs. 4 and 6, the mold heater 30 being energized, heat will flow from each of the two branches of the mold heater 30 through the heat conductors 131, 135 and 120 to the sensing bulb 122d, whereupon the thermostat switch 122a is reset and returned to the full line position shown in Fig. 3.

When the ice pieces are thawed free of the mold compartments by the mold heater 30, the ejector motor 80 resumes its rotation and the ejector blades 72 sweep the ice pieces from the mold and bring them for rest in the drying or upside-down position shown in Fig. 5. This last rotation of the ejector shaft will return the heat conductor 135 from the position shown in Figs. 4 and 6 to that shown in broken lines in Fig. 5, thereby breaking the heat path between the mold heater 30 and the sensing bulb 120d of the mold thermostat. By this time the thermostat switch blade 122a will have returned to the full line position shown in Fig. 3 and the high portion of cam 166 on shaft 167 will have drawn away from the switch plunger 161 and the switch blade 160a will have returned to its full line position (Fig. 3) assuming that the ice receptacle is not yet filled with ice and that the stop arm 175 and attached ball 176 have returned to the lower position.

By the time that the ejector motor 80 has rotated the ejector shaft 71 and attached ejector blades 72 to the position shown in Fig. 5, the toothed portion 88a of timing gear 88 (Fig. 1) will have left the teeth of ejector gear 77, and the high portion of timing cam 90 will be in contact with the low portion of the ejector cam 78, and the motor is again unloaded although it continues to rotate. During this unloaded period of rotation of the ejector motor, the high portion of cams 158a and 158b will contact the roller 155 on switch arm 153, whereupon the plunger 151 of micro switch 150 (Fig. 7) is depressed and remains so depressed for approximately ten seconds during which time the switch blade 150a (Fig. 3) is in the broken line position and the coil of the solenoid water valve 100 is energized, whereupon water in a metered quantity flows through the solenoid valve 100, the outlet tube 105, vertical passage 42 and outlet passage 42a (Figs. 1 and 5) into the rear ice forming compartment of the mold. From the rear ice forming compartment, the water flows through the notches 24 in the mold partitions to the forward compartments of the mold.

The ejector motor 80 and the timing gear assembly continue to rotate unloaded, whereupon the high portions of cams 156a and 156b withdraw from the roller 155 of switch arm 153, thereby shifting the switch 150a back to the full line position (Fig. 3) which deenergizes and closes the solenoid valve 100. Shortly thereafter, the high portions of cams 156a and 156b will have returned to the positions shown in Fig. 1 with the plunger 141 of micro switch 140 depressed and the switch blade 140a shifted back to the full line position in Fig. 3, which deenergizes the ejector motor 80 and ends the ejecting cycle.

With each of the switches returned to the full line position in Fig. 3, the ejector motor 80, the mold heater 30 and the solenoid water valve 100 are deenergized, the heat conductor 135 is in the broken line position shown in Fig. 5, the compressor motor 180 is energized and a new freezing cycle is started. During the freezing cycle, the heat conductor 135 remains in the broken line position shown in Fig. 5, out of thermal contact with the heat conductors 131 and 120, so that during freezing cycles, the sensing element 122d of the mold thermostat is influenced only by the temperature of the water being frozen in the rear ice-forming compartment of the mold.

It is to be noted that with the switch blade 150a in the broken line position (Fig. 3), the only circuit to the coil of the solenoid water valve 100 is from T2 through switch blade 140a (in broken line position), stationary contact 140c, conductor 203, switch blade 122a (in full line position) stationary contact 122c, conductor 208, switch blade 150a (in broken line position) stationary contact 150c, conductor 212, the coil of solenoid 100, conductor 213, limit switch 80b of the ejector motor, conductor 206, and conductor 207 to T1. Also, with the switch blade 150a in broken line position, the only circuit to the ejector motor 80 and to the mold heater 30 is through conductor 208. Therefore, should the thermostat switch 122a fail to reset to the full line or warm position shown in Fig. 3 by the time the micro switch 150a has been shifted to the broken line position, the entire ice maker is rendered inoperative, with the ejector motor, the compressor motor, the mold heater, and solenoid water valve deenergized, and with the water valve closed. Inability of the heat transfer mechanism 130 to reset the thermostat switch 122a is an indication that the thermostat has failed, lost its charge, and must be replaced before the ice maker can be rendered operative. Also, it is to be noted that the coil of the solenoid water valve 100 is wired in series with the overload limit switch 80b of the ejector motor, so that, should the switch 80b open for any reason and stop the ejector motor while the high portion of cams 156a and 156b are in contact with the roller 155 of micro switch 150, thereby holding the switch blade 150a in the broken line position (Fig. 3) with the solenoid coil energized and the water valve open, the coil is immediately deenergized and the valve closed.

Without further description it is thought that the novel features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. In an automatic ice maker, an ice mold having a plurality of ice-forming compartments therein, means for filling the mold with water to be frozen, refrigerating means for freezing the water in the mold, a mold heater for thawing the ice free of the mold, ejector mechanism including mechanical means movable into contact with the ice in the mold for removing the ice from the mold, and control mechanism for said filling, freezing, thawing and ejector means, said control mechanism including a thermostat operable responsive to the freezing of ice in the mold for energizing said ejector mechanism, and means operable by movement of said ejector mechanism for transferring heat from said mold heating means to a portion of said thermostat to reset said thermostat after the ejector mechanism has been energized.

2. An automatic ice maker as set forth in claim 1 wherein said ejector mechanism includes means thereon for establishing and interrupting a heat path between said mold heater and said thermostat at the beginning and end, respectively, of movement of said mechanism.

3. An automatic ice maker as set forth in claim 1 wherein said ejector mechanism includes a rotatable member movable into contact with ice in the mold for removing the ice therefrom, and wherein said rotatable member includes a heat conductor mounted thereon and movable into and out of thermal contact with said mold heater to thereby establish and interrupt, respectively, a heat path between the mold heater and the thermostat.

4. In an automatic ice maker, an ice mold divided into a plurality of ice forming compartments, means for filling the mold with water to be frozen, refrigerating means for freezing the water in the mold, mold heating means for thawing the ice free of the mold compartments, ejector mechanism for removing the ice from the mold and control mechanism for energizing and deenergizing said filling, thawing and ejector means, said ice mold having one ice-forming compartment thereof partially insulated from said refrigerating means whereby unfrozen water remains in said one compartment after the water is completely frozen in the other of said plurality of compartments, and said control means including a thermostat operable responsive to the complete freezing of water in said one compartment and having a temperature sensing element thereof in thermal contact with water in said one mold compartment, and means for establishing and interrupting a heat path between said mold heater and said temperature sensing element during periods of energization and deenergization, respectively, of said mold heater.

5. In an automatic ice maker, an ice mold, means for filling the mold with water to be frozen, refrigerating means for freezing the water in the mold, heating means for thawing the ice free of the mold, means movable into engagement with ice in the mold for removing the ice from the mold, a thermostat operable responsive to the complete freezing of water in the mold for energizing said filling, heating and removing means, means operable by movement of the ice removing means for transferring heat from said heating means to a part of said thermostat to reset the thermostat after having energized said ice removing means, and means for adjusting the amount of heat transferred to said thermostat.

6. An automatic ice maker as set forth in claim 5 wherein the means for transferring heat to the thermostat includes a heat conductor movable into and out of thermal contact with said mold heater during ice removing and ice freezing cycles, respectively, of said ice maker.

7. An automatic ice maker as set forth in claim 5 wherein the means for transferring heat to said thermostat includes a heat conductor movable into and out of thermal contact with said mold heater to thereby establish and interrupt a heat path to the thermostat during periods of energization and deenergization, respectively, of said mold heater.

8. An automatic ice maker as set forth in claim 7 wherein said heat conductor is mounted on said ice removing means for movement into and out of thermal contact with said mold heater during ice removing and ice freezing cycles, respectively, of said ice maker.

References Cited in the file of this patent

UNITED STATES PATENTS

| | | |
|---|---|---|
| 2,221,694 | Potter | Nov. 12, 1940 |
| 2,259,066 | Gaston | Oct. 14, 1941 |
| 2,407,058 | Clum | Sept. 3, 1946 |
| 2,418,572 | Brennan | Apr. 8, 1947 |
| 2,549,747 | Leeson | Apr. 17, 1951 |
| 2,563,093 | Bayston | Aug. 7, 1951 |
| 2,593,874 | Grandia | Apr. 22, 1952 |
| 2,682,155 | Ayres | June 29, 1954 |
| 2,693,680 | Lee | Nov. 9, 1954 |
| 2,747,375 | Pichler | May 29, 1956 |